(12) United States Patent
Kim et al.

(10) Patent No.: US 9,897,847 B2
(45) Date of Patent: Feb. 20, 2018

(54) DISPLAY DEVICE

(71) Applicant: Samsung Display Co., Ltd., Yongin-Si, Gyeonggi-Do (KR)

(72) Inventors: Dong-uk Kim, Hwaseong-si (KR); Youngmin Kim, Asan-si (KR); Haeil Park, Seoul (KR); Seon-tae Yoon, Seoul (KR); Junhan Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/171,552

(22) Filed: Jun. 2, 2016

(65) Prior Publication Data

US 2017/0097541 A1 Apr. 6, 2017

(30) Foreign Application Priority Data

Oct. 6, 2015 (KR) ........................ 10-2015-0140515

(51) Int. Cl.
*G02F 1/1335* (2006.01)
*G02F 1/1337* (2006.01)
(Continued)

(52) U.S. Cl.
CPC ..... *G02F 1/133514* (2013.01); *G02B 6/0035* (2013.01); *G02B 6/0091* (2013.01);
(Continued)

(58) Field of Classification Search
CPC ........ G02F 1/133514; G02F 1/133611; G02F 1/133528; G02F 1/1337; G02F 1/167;
(Continued)

(56) References Cited

U.S. PATENT DOCUMENTS 3,963,312 A * 6/1976 Wild ................. G02F 1/133528
349/113
5,094,788 A 3/1992 Schrenk et al.
(Continued)

FOREIGN PATENT DOCUMENTS

| KR | 1020060112157 A | 10/2006 |
| KR | 1020070082305 A | 8/2007 |
| KR | 1020120123963 A | 11/2012 |

OTHER PUBLICATIONS

Fink, et. al., "A Dielectric Omnidirectional Reflector," Science vol. 282, pp. 1679-1682, Nov. 27, 1998.
(Continued)

*Primary Examiner* — Donald Raleigh
(74) *Attorney, Agent, or Firm* — Cantor Colburn LLP

(57) ABSTRACT

A display device includes a display member and a backlight unit, where the display member includes a base substrate, a cover layer that is on the base substrate, extends in a first direction, and includes a plurality of portions defining a first cavity and a second cavity that are spaced apart from the base substrate and adjacent to each other in the first direction, a first display element and a second display element that respectively correspond to the first cavity and the second cavity, a color conversion filter that is disposed on the cover layer, and includes a first filter which overlaps the first cavity and converts incident light into a first color light, and a second filter which overlaps the second cavity and converts incident light into a second color light, and an optical member which is disposed between the color conversion filter and the cover layer.

20 Claims, 12 Drawing Sheets

(51) Int. Cl.
*G02F 1/1333* (2006.01)
*F21V 8/00* (2006.01)
*G02F 1/167* (2006.01)

(52) U.S. Cl.
CPC ...... *G02F 1/1337* (2013.01); *G02F 1/133345* (2013.01); *G02F 1/133528* (2013.01); *G02F 1/133611* (2013.01); *G02F 1/133617* (2013.01); *G02F 1/167* (2013.01)

(58) Field of Classification Search
CPC ......... G02F 1/133617; G02F 1/133345; G02B 6/0091; G02B 6/0035
See application file for complete search history.

(56) References Cited

U.S. PATENT DOCUMENTS

| | | | |
|---|---|---|---|
| 5,122,905 A | 6/1992 | Wheatley et al. | |
| 5,882,774 A | 3/1999 | Jonza et al. | |
| 5,886,756 A * | 3/1999 | Lee | G02F 1/1362 349/106 |
| 5,978,062 A * | 11/1999 | Liang | G02F 1/133371 349/132 |
| 6,445,495 B1 * | 9/2002 | Walker | H01S 5/5072 359/344 |
| 2004/0012845 A1 * | 1/2004 | Wang | H01S 5/423 359/344 |
| 2004/0212603 A1 * | 10/2004 | Cok | G06F 3/0412 345/175 |
| 2006/0012733 A1 * | 1/2006 | Jin | G02F 1/13336 349/73 |
| 2006/0065900 A1 * | 3/2006 | Hsieh | G02B 27/0927 257/79 |
| 2006/0238671 A1 * | 10/2006 | Kim | B82Y 20/00 349/71 |
| 2009/0015902 A1 * | 1/2009 | Powers | E06B 9/24 359/288 |
| 2014/0198283 A1 * | 7/2014 | Jin | G02F 1/133377 349/106 |
| 2016/0161650 A1 * | 6/2016 | Taraschi | G02B 5/28 349/70 |
| 2016/0161788 A1 * | 6/2016 | Wu | G02F 1/133345 349/43 |

OTHER PUBLICATIONS

S.V. Subramanyam, "Optical Reflection from Cholesteric Liquid Crystal Films", Applied Optics, Feb. 1971, vol. 10 No. 2, pp. 317-320.

* cited by examiner

DISPLAY DEVICE

This application claims priority to Korean Patent Application No. 10-2015-0140515, filed on Oct. 6, 2015, and all the benefits accruing therefrom under 35 U.S.C. § 119, the content of which in its entirety is herein incorporated by reference.

BACKGROUND

1. Field

Exemplary embodiments of the invention herein relate to a display device, and more particularly to a display device with improved optical efficiency.

2. Description of the Related Art

A display device may be classified as a light emitting display device such as an organic light emitting display device, and a non-light emitting display device such as a liquid crystal display device. The non-light emitting display device includes a backlight unit for providing light.

Typically, the backlight unit provides the light of a single color, but images with diverse colors are displayed using a color filter, and the like. A light intensity or color purity of the light may be affected as the light emitted from the backlight unit passes through a display panel and the color filter.

SUMMARY

Therefore, a display device according to an exemplary embodiment of the invention may provide the display device with both improved color purity and improved optical efficiency.

A display device according to an exemplary embodiment of the invention includes a display member which displays images, and a backlight unit which provides light to the display member.

The base member includes a base substrate, a cover layer that is on the base substrate, extends in a first direction, and includes a plurality of portions defining a first cavity and a second cavity that are spaced apart from the base substrate and adjacent to each other in the first direction, a first display element and a second display element that respectively correspond to the first cavity and the second cavity, a color conversion filter that is disposed on the cover layer, and includes a first filter overlapping the first cavity and which converts incident light into a first color light, and a second filter overlapping the second cavity and which converts incident light into a second color light, and an optical member which is disposed between the color conversion filter and the cover layer, and which selectively transmits or reflect incident light according to the color.

In an exemplary embodiment, the light provided by the backlight unit may have a third color, and among the incident light, the optical member may reflect the first color light or the second color light, and transmit the third color light.

In an exemplary embodiment, light incident on the optical member may include among light provided by the backlight unit, the light that passes through the first cavity and the second cavity to be incident on the optical member, and among the first color light and the second color light which are generated from the color conversion filter, the light that is incident on the optical member.

In an exemplary embodiment, the first filter and the second filter may respectively transmit the reincident first color light and second color light reflected from the optical member.

In an exemplary embodiment, the color conversion filter may further include a third filter which converts incident light into third color light, and to transmit the third color light.

In an exemplary embodiment, the plurality of portions may each be spaced apart from the base substrate, from one end to the other end in a second direction crossing the first direction.

In an exemplary embodiment, each of the first cavity and second cavity may have a tunnel shape extending in the second direction.

In an exemplary embodiment, liquid crystal may be filled in each of the first cavity and the second cavity, and each of the first display element and the second display element may be a liquid crystal capacitor.

In an exemplary embodiment, the display member may further include an alignment film that is disposed on the inner surface of the cover layer, and provided in the first cavity and the second cavity.

The display device according to an exemplary embodiment of the invention may further include a polarizing member disposed between the display member and the backlight unit, and having a transmission axis of which the direction is parallel to the first direction.

In an exemplary embodiment, the optical member may include a polarizing layer having a transmission direction perpendicular to the first direction and parallel to the second direction, and a selective transmission/reflection layer which is disposed on the polarizing layer and which, among the incident light, reflects the first color light and the second color light, and transmits the third color light.

In an exemplary embodiment, the selective transmission/reflection layer may include a plurality of first insulating layers, each of which has a first refractive index, and a plurality of second insulating layers, each of which has a second refractive index that differs from the first refractive index, where the plurality of first insulating layers and the plurality of second insulating layers are alternatingly laminated.

In an exemplary embodiment, wherein the thickness of the selective transmission/reflection layer may be equal to or less than about 10 micrometers (μm).

In an exemplary embodiment, the selective transmission/reflection layer may be a cholesteric liquid crystal film or a photonic crystal film.

In an exemplary embodiment, the color conversion filter may include a plurality of quantum dots.

In an exemplary embodiment, the quantum dots may include a plurality of first particles that are included in the first filter, and a plurality of second particles that are included in the second filter, wherein the particle size of each of the first particles may be different from the particle size of each of the second particles.

A display device according to an exemplary embodiment of the invention includes a backlight unit which provides a first color light, a panel member which receives the first color light and includes a plurality of pixels, an optical member which is disposed on the panel member and which, among the incident light, reflects the first color light and transmits a second color light that is different from the first color light, and a color conversion filter disposed on the optical member and including a plurality of quantum dots.

In an exemplary embodiment, a plurality of cavities respectively corresponding to the pixels may be defined in the panel member, each of the cavities being filled with liquid crystal.

In an exemplary embodiment, the optical member may include a polarizing film which transmits light that oscillates in one direction, a plurality of first insulating films disposed on the polarizing film and each having a first refractive index, and a plurality of second insulating films disposed on the polarizing film, each having a second refractive index, and alternatingly laminated with the first insulating films.

In an exemplary embodiment, the panel member may include the plurality of cavities arranged in a matrix form, each of the cavities being filled with liquid crystal, and the color conversion filter may include a plurality of filters respectively corresponding to the cavities, and a black matrix disposed between the filters.

In an exemplary embodiment, the filters may include a first filter including, among the quantum dots, the quantum dots which receive the first color light to generate the second color light, and a second filter which transmits the first color light.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
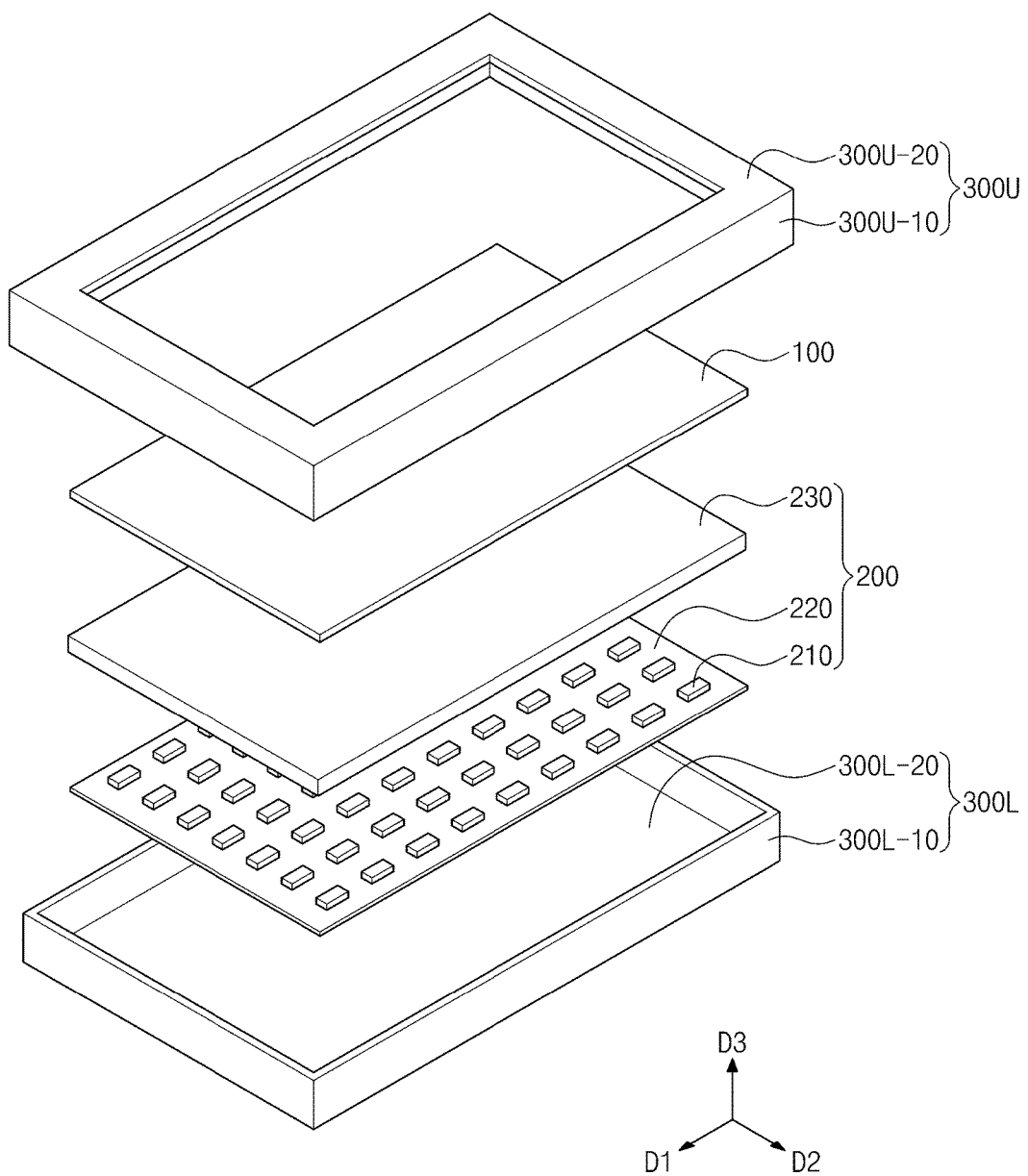
FIG. 1 is an exploded perspective view of an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2A:
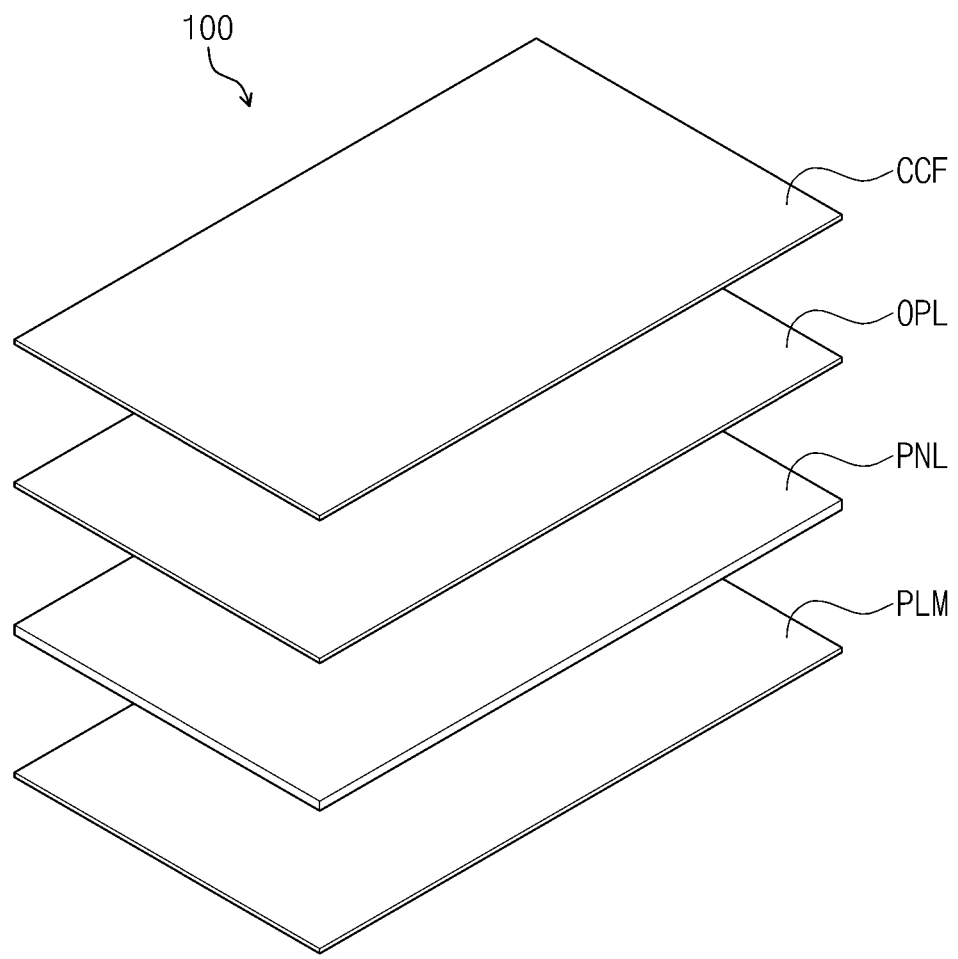
FIG. 2A is an exploded perspective view of a display member illustrated in FIG. 1.
Figure 2B:
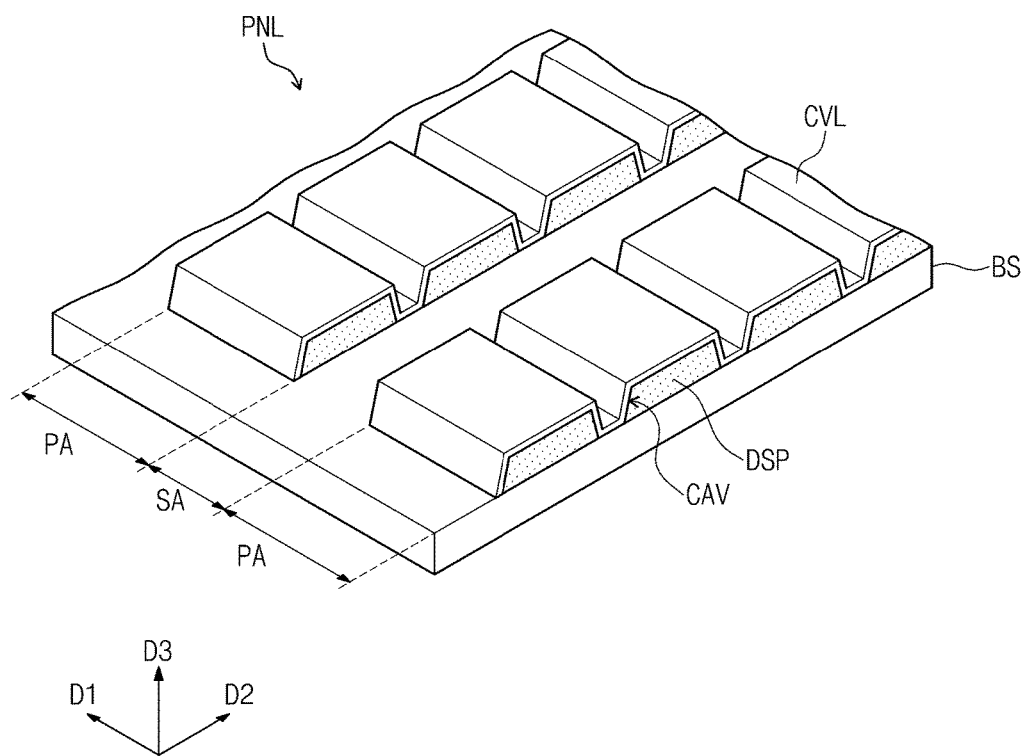
FIG. 2B is a partial perspective view illustrating an exemplary configuration of a display member that is illustrated in FIG. 2A.

Exemplary embodiments of the invention will be described below in more detail with reference to the accompanying drawings. FIG. 1 is an exploded perspective view of a display device according to an exemplary embodiment of the invention. FIG. 2A is an exploded perspective view of a display member illustrated in FIG. 1. FIG. 2B is a partial perspective view illustrating an exemplary configuration of a display member that is illustrated in FIG. 2A.

The display device includes a display member 100, a backlight unit 200, and a plurality of protective members 300L and 300U. The protective members 300L and 300U include a lower protective member 300L and an upper protective member 300U.

The display member 100 may be a plate form having a plane that is defined by a first direction D1 and a second direction D2. The display member 100 includes a polarizing member PLM, a panel member PNL, an optical member OPL, and a color conversion filter CCF that are laminated in an upward direction D3.

The polarizing member PLM polarizes incident light into light that oscillates in a single direction. The polarizing member PLM is disposed on a rear surface of the panel member PNL and polarizes incident light. Accordingly, the panel member PNL receives the polarized light.

There may be various exemplary embodiments of the polarizing member. In an exemplary embodiment, the polarizing member PLM may be provided as a film type and disposed on the rear surface of the panel member, or attached by a separately provided adhesive member, for example. In an exemplary embodiment, for example, the polarizing member PLM may be disposed on the panel member PNL by being directly applied as a liquid or deposited thereon.

The panel member PNL receives an applied electrical signal and thereby generates images. The panel member PNL may include various exemplary embodiments that include a plurality of pixels.

Referring to FIG. 2B, the panel member PNL may include a base substrate BS, a cover layer CVL, and a display element DSP. In FIG. 2B the panel member PNL is illustrated as a perspective view to enable easy description thereof. The panel member PNL may further include elements other than those illustrated in FIG. 2B, but is not limited to any particular embodiment.

The base substrate BS is a base layer on which are disposed various elements, and may be configured with material having a high optical transmittance. In an exemplary embodiment, the base substrate BS may be a transparent glass substrate, a transparent plastic substrate, or a transparent film, for example.

The base substrate BS may be divided on a plane into one or more pixel areas PA and surrounding areas SA that are adjacent to the pixel areas PA. In the illustrated exemplary embodiment, there may be a plurality of the pixel areas PA, and the surrounding areas SA may be defined between the pixel areas PA.

When an electrical signal is applied, a light is displayed in the pixel area PA. The light displayed in each of the pixel areas make up the images that are generated by the panel member PNL. The display element DSP, which is described below, is disposed on the pixel area.

Various signal lines that each transport electrical signals or drive elements that drive the pixels may be disposed on the surrounding area SA. The surrounding area SA does not display images, even when the electrical signal is applied thereto. The surrounding area SA defines the part surrounding the pixel area PA, and defines the boundary between the plurality of pixel areas PA.

The cover layer CVL is disposed on the base substrate BS. A plurality of the cover layers may be disposed on the same layer and arranged spaced apart from each other in the first direction D1. In the exemplary embodiment, one cover layer is exemplarily described.

The cover layer CVL is an integrated form extending in the second direction D2. A part of the cover layer contacts the base substrate BS and another part is spaced apart from the base substrate BS.

The cover layer CVL includes a plurality of portions. The portions include a plurality of spaced portions that are each spaced apart from the base substrate BS, and a plurality of contacting portions that each contacts the base substrate BS.

The spaced portions are each spaced apart from the base substrate BS, from one end of the first direction D1 to the other end thereof. The base substrate BS, one of the spaced portion, and the two contacting portions that are connected to each end of the spaced portion define a single cavity. Accordingly, the cavity may be a tunnel form extended in the first direction D1.

The spaced portions and contacting portions are arranged alternatingly in the second direction D2, and are connected to each other to provide an integrated configuration. Accordingly, the cover layer CVL and base substrate BS may define a plurality of the cavities arranged in the second direction D2. Each of the cavities is open in the first direction D1 and closed in the second direction D2.

The display element DSP is disposed on the pixel area PA. A plurality of the display elements is illustrated in FIG. 2B. Specifically, the display elements may be disposed in the respective cavities.

The display element DSP may display light that is controlled according to the electrical signal, and may include various exemplary embodiments. In an exemplary embodiment, the display element DSP may be a liquid crystal capacitor or an electrophoretic element. Detailed description thereof is given below, for example.

Referring back to FIG. 2A, the color conversion filter CCF is disposed on the optical member OPL. The color conversion filter CCF may convert the light incident on the color conversion filter CCF into various colors. The light of which the color was converted by the color conversion filter CCF may be emitted in various directions from the color conversion filter CCF.

The light generated in the backlight unit 200 does not change in color while passing through the polarizing member PLM, the panel member PNL, and the optical member OPL to reach the color conversion filter CCF. Accordingly, the light generated in the backlight unit 200 may be realized as the image while having the various colors that are due to the color conversion filter CCF. Detailed description thereof is described below.

The optical member OPL is disposed between the panel member PNL and color conversion filter CCF and receives the light displayed by the panel member PNL. The optical member OPL may include materials having optical transmittance. Accordingly, at least a portion of the light displayed by the panel member PNL may be provided to the color conversion filter CCF through the optical member OPL.

The optical member OPL polarizes the incident light and selectively reflects or transmits the incident light. The optical member OPL may simultaneously perform the functions of both a polarizing layer and a selective reflection layer.

Specifically, the optical member OPL functions as the polarizing layer that faces the polarizing member PLM. Accordingly, the optical member OPL polarizes the light in a direction perpendicular to the direction toward which the polarizing member PLM polarizes the light that is incident on the optical member OPL.

Moreover, the optical member OPL selectively transmits or reflects the incident light. Specifically, the optical member OPL transmits or reflects the incident light according to the color of the incident light.

In the illustrated exemplary embodiment, the optical member OPL transmits blue light and reflects red or green light, for example. Accordingly, when the backlight unit 200 generates blue light, the light generated by the backlight unit 200 may pass through the optical member OPL to arrive at the color conversion filter CCF.

In the optical member OPL, the red or green light among the light emitted from the color conversion filter CCF may be reflected from the optical member OPL and be reincident on the color conversion filter CCF. Accordingly, the luminance of the red or green light may be enhanced such that color reproducibility is improved. Detailed description thereof is given below.

The backlight unit 200 may include a plurality of light emitting elements 210, a circuit board 220, and a diffusion member 230. The light emitting elements 210 receive an applied voltage and thereby generate light.

In the exemplary embodiment, the light emitting elements 210 generate light that has a relatively short wavelength. In an exemplary embodiment, the light emitting elements 210 may generate blue light, for example.

In an exemplary embodiment, the light emitting elements 210 may generate the light with a wavelength that is substantially in the range of about 400 nanometers (nm) to about 500 nm, for example. The light generated by the light emitting elements 210 becomes an energy source that excites the color conversion filter CCF.

The light emitting elements 210 according to an exemplary embodiment of the invention may include various exemplary embodiments. In an exemplary embodiment, each of the light emitting elements 210 may be a light emitting diode ("LED"), an ultraviolet lamp, or a laser diode, for example.

The circuit board 220 may be a plate form having the same size as the display member 100. Accordingly, the light emitting elements 210 may provide light to an area corresponding to the rear surface of the display member 100, and thereby the image displayed by the display member 100 may be improved.

The diffusion plate 230 is disposed on the light emitting elements 210. The diffusion plate 230 diffuses the incident light. The light emitted from each of the light emitting elements 210 may be mixed by the diffusion plate 230. The diffusion plate 230 enables light having a uniform luminance to be provided over the entire surface of the display member 100, regardless of position.

The lower protective member 300L includes a lower side wall part 300L-10 and a bottom part 300L-20. The lower side wall part 300L-10 is bent upward from the bottom part 300L-20 to define a predetermined inner space. The display member 100 and backlight unit 200 are stored in the inner space.

The upper protective member 300U includes an upper side wall part 300U-10 and a top part 300U-20. A predetermined opening is defined in the top part 300U-20. The image generated by the display member 100 may be perceived from the outside through the opening.

The upper side wall part 300U-10 is bent downward from the top part 300U-20. The upper protective member 300U and lower protective member 300L may be combined to protect the display member 100 and backlight unit 200, and define the external shape of the display device.

Figure 3:
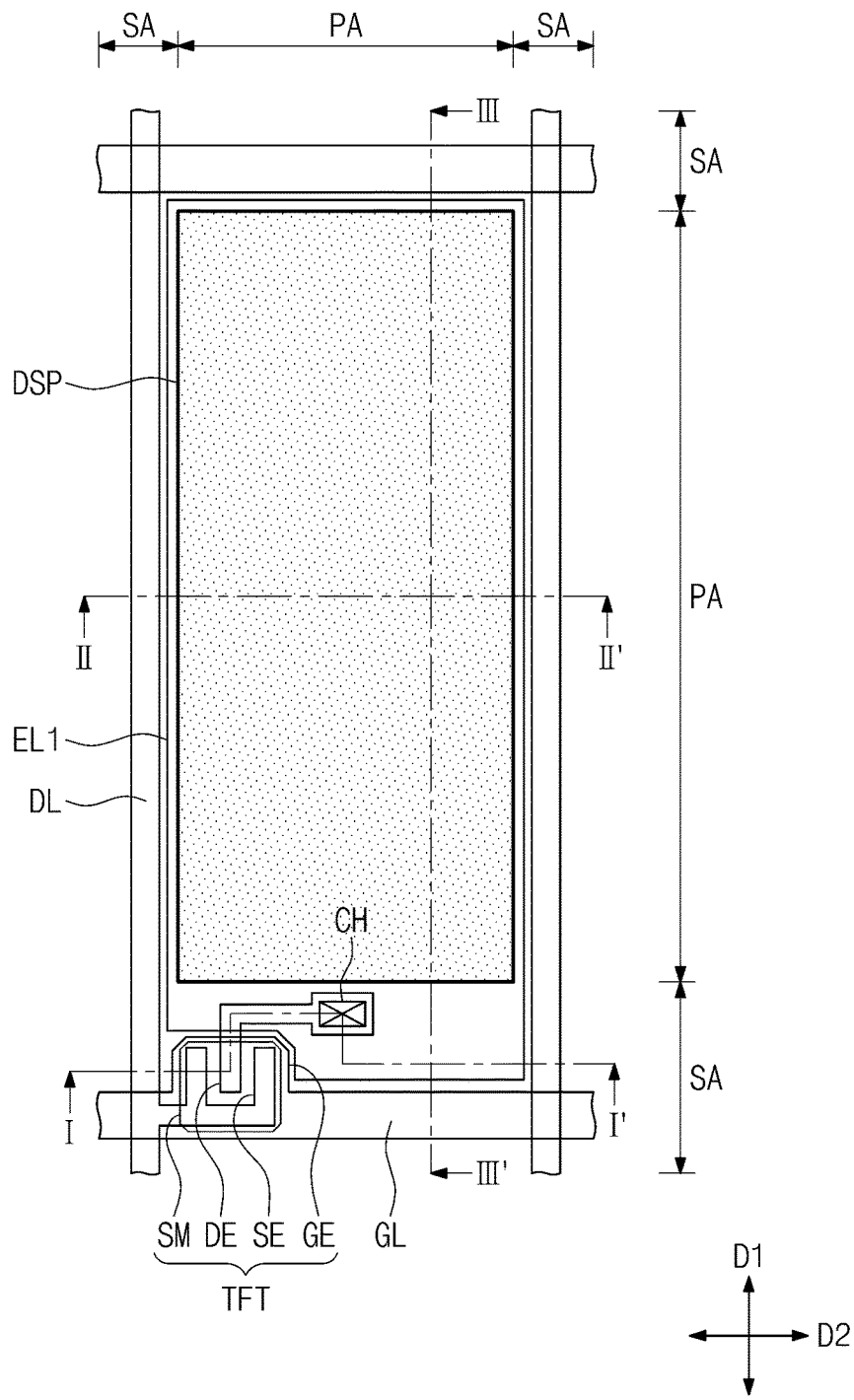
FIG. 3 is a partial plan view of a display member according to an exemplary embodiment of the invention.
Figure 4:
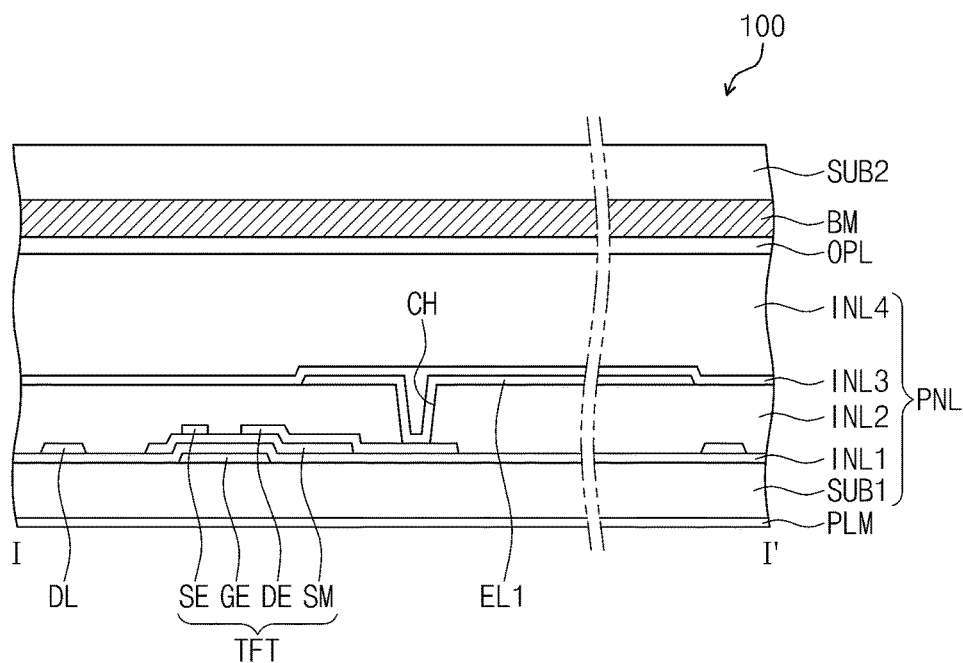
FIG. 4 is a cross-sectional view taken along line I-I' in FIG. 3.
Figure 5:
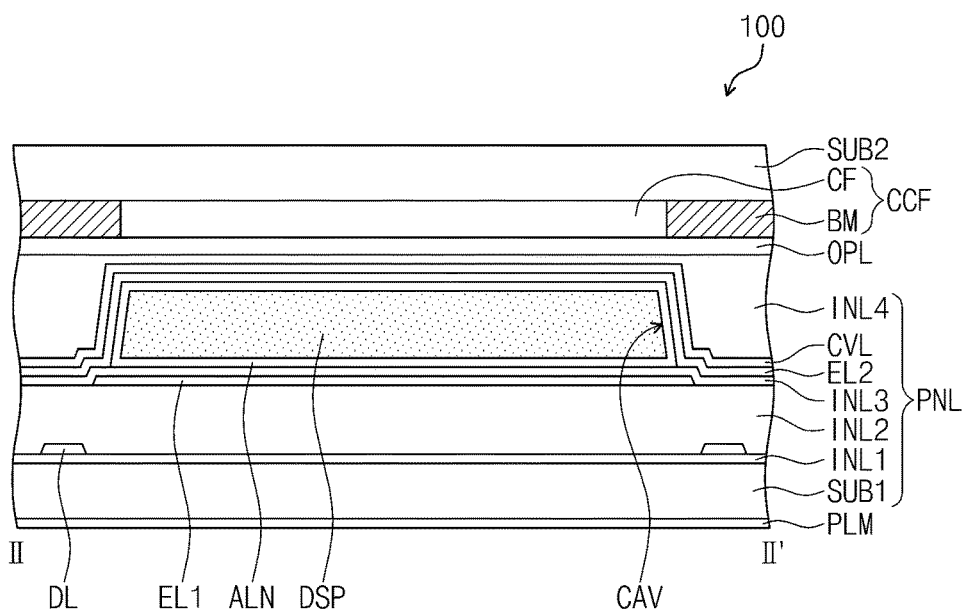
FIG. 5 is a cross-sectional view taken along line II-II' in FIG. 3.
Figure 6:
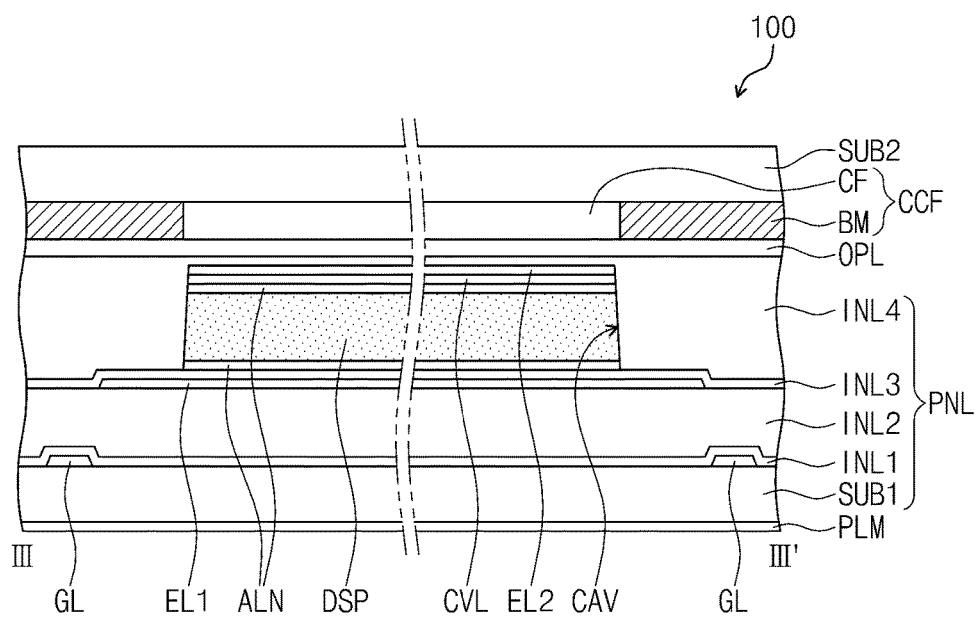
FIG. 6 is a cross-sectional view taken along line III-III' in FIG. 3.

FIG. 4 is a cross-sectional view taken along line I-I' in FIG. 3. FIG. 5 is a cross-sectional view taken along line II-II' in FIG. 3. FIG. 6 is a cross-sectional view taken along line III-III' in FIG. 3.

For ease of description, FIGS. 3 to 6 are illustrated in terms of a single pixel. Hereinafter, with reference to FIGS. 3 to 6, the display member 100 according to an exemplary embodiment of the invention will be described in greater detail. Elements that are identical to those illustrated in FIGS. 1 to 2B will be assigned identical reference labels, and duplicate descriptions thereof will not be given.

The pixel includes the display element DSP that is disposed on the pixel area, and one or more thin film transistors TFT that are connected to the display element DSP. In the exemplary embodiment, the thin film transistor TFT is disposed on the surrounding area SA. However, this is merely an exemplary illustration, and the thin film transistor TFT may be disposed on a different layer from the display element DSP, while being arranged to overlap the pixel area PA.

The thin film transistor TFT may constitute the base substrate BS (refer to FIG. 2B). The base substrate BS may include a first substrate SUB1, a first insulating layer INL1, a second insulating layer INL2, and the thin film transistor TFT.

The first substrate SUB1 may include transparent insulating materials. The first substrate SUB1 may have a high optical transmittance to enable the light that is generated by the backlight unit (not shown), which is disposed on the rear surface of the first substrate SUB1, and polarized by the polarizing member PLM to easily reach the display element DSP. Although not shown, in an exemplary embodiment, the adhesive member may be further included between the polarizing member PLM and first substrate SUB1, and in this case, the adhesive member may include material having a high optical transmittance.

A gate electrode GE of the thin film transistor TFT is disposed on the first substrate SUB1. Here, among the signal lines, a gate line GL may be disposed on the same layer as that on which the gate electrode GE is disposed. The gate electrode GE may be connected to the gate line GL to receive gate signals. In an exemplary embodiment, the gate electrode GE and the gate line GL may be unitary.

The first insulating layer INL1 covers the gate electrode GE and gate line GL. The thin film transistor TFT and a semiconductor pattern SM are disposed on the first insulating layer INL1. The semiconductor pattern SM overlaps at least the gate electrode GE.

A source electrode SE and a drain electrode DE of the thin film transistor TFT are disposed on the semiconductor pattern SM. Here, among the signal lines, the data line DL may be disposed on an area on which the semiconductor pattern SM of the first insulating layer INL1 is not disposed.

The source electrode SE is connected to the data line DL and receives data signals from the data line DL. When predetermined signals are provided to each of the gate electrode GE and source electrode SE, a channel is defined on the semiconductor pattern SM. The data signals may be transported from the source electrode SE to the drain electrode DE by the channel.

The second insulating layer INL2 may cover the thin film transistor TFT and data line DL. The second insulating layer INL2 may include an organic layer or an inorganic layer or both. Moreover, a plurality of the organic and inorganic layers may be alternatingly laminated in the second insulating layer INL2

The second insulating layer INL2 may be a passivation film. Accordingly, the second insulating layer INL2 insulates the thin film transistor TFT from the other components and protects the thin film transistor TFT from moisture, and the like.

The second insulating layer INL2 may be a flattening layer providing a flat top surface. The second insulating layer INL2 offsets the step heights produced by the thin film transistor TFT, thereby allowing the electronic elements disposed on the thin film transistor TFT to be arranged in a stable manner.

The cover layer CVL may be disposed on the second insulating layer INL2. As described above, the cover layer CVL may either partially contact the base substrate BS or be spaced apart from the base substrate BS to define the cavity CAV.

The cavity CAV is defined in the pixel area PA. Accordingly, the display element DSP may be disposed in the pixel area PA. The display element DSP may be disposed on the second insulating layer INL2.

The display element DSP may comprise a first electrode EL1, a second electrode EL2 and a liquid crystal LC. The liquid crystal LC disposed between the first electrode EL1 and the second electrode EL2. The first electrode EL1, the second electrode EL2, and the liquid crystal LC forms a capacitor. The first electrode EL1 may be provided by being patterned into a shape corresponding to the pixel area PA. Accordingly, a plurality of the first electrodes EL1 may be provided to be respectively disposed in each of the pixel areas.

The first electrode EL1 is disposed on the second insulating layer INL2 and is connected to the drain electrode DE through a penetrating part CH penetrating through the second insulating layer INL2. Accordingly, the first electrode EL1 may be driven by the thin film transistor.

Here, the panel member PNL may further include a third insulating layer INL3. The third insulating layer INL3 insulates the first electrode EL1 from the other components. The third insulating layer INL3 may be patterned into a shape corresponding to the shape of the first electrode EL1.

Moreover, as illustrated in FIGS. 4 to 6, the third insulating layer INL3 may cover the entire surface of the base substrate BS. Here, the cover layer CVL may either partially contact the third insulating layer INL3 or be partially spaced apart from the third insulating layer INL3 to define the cavity CAV. The third insulating layer INL3 according to an exemplary embodiment of the invention may include various exemplary embodiments, but is not limited to any one embodiment.

The second electrode EL2 is disposed in the cavity. When the cover layer CVL includes an interior in which the cavity is defined and an exterior that is exposed to the outside, the second electrode EL2 is disposed in the interior of the cover layer CVL.

Although not shown, the second electrode EL2 is connected to a common voltage line (not shown) disposed in the surrounding area of the base substrate BS. The second electrode EL2 faces the first electrode EL1. The second electrode EL2 receives an applied common voltage from the common voltage line.

In the exemplary embodiment, the first electrode EL1 and the second electrode EL2 may each include transparent conductive materials. The higher the optical transmittance is for each of the first electrode EL1 and second electrode EL2, the greater may be the decrease in the loss factor of the light intensity.

The liquid crystal LC is filled into the cavity CAV. The liquid crystal LC includes a plurality of liquid crystal molecules that may be arranged in particular directions according to the voltage difference between the first electrode EL1 and second electrode EL2. The display element may control the voltage difference between the first electrode EL1 and second electrode EL2 to thereby control the light intensity of the light, which is among the light generated in the backlight unit 200 and passes through the cavity CAV.

The panel member PNL according to an exemplary embodiment of the invention may further include an alignment film ALN. A plurality of the alignment films ALN may be provided and be respectively disposed on the first electrode EL1 side and the second electrode EL2 side.

Although not shown, at least one side of the cavity CAV may be open in the first direction D1 and covered with the alignment film ALN. Here, the cavity CAV may be defined by the alignment film ALN to have a form in which one side is open and another side is closed. The alignment film ALM according to an exemplary embodiment of the invention may include various exemplary embodiments, but is not limited to any particular embodiment.

The panel member PNL may further include a fourth insulating layer INL4. The fourth insulating layer INL4 is disposed on the third insulating layer INL3 and covers the cover layer CVL.

The pixel area PA and surrounding area SA of the base substrate BS are all covered by the fourth insulating layer INL4. Accordingly, the fourth insulating layer INL4 may cover each open end of the cover layer CVL to thereby seal the cavity CAV.

The fourth insulating layer INL4 may include transparent insulating materials. In an exemplary embodiment, the fourth insulating layer INL4 may include organic material or inorganic material or both, for example. Moreover, a plurality of organic and inorganic films may also be alternatingly laminated in the fourth insulating layer INL4.

The fourth insulating layer INL4 may be an encapsulation layer isolating the display element DSP from the outside environment. In addition, the fourth insulating layer INL4 may be a flattening layer providing a flat top surface. The fourth insulating layer INL4 may include various exemplary embodiments, but is not limited to any particular embodiment.

The optical member OPL is disposed on the fourth insulating layer INL4. The optical member OPL may be disposed directly on the fourth insulating layer INL4, or provided separately and then disposed on the fourth insulating layer INL4. When the optical member OPL is provided separately and then assembled on the panel member PNL, a predetermined adhesive layer or air layer may be further disposed between the optical member OPL and panel member PNL.

The color conversion filter CCF is disposed between a second substrate SUB2 and the optical member OPL. The color conversion filter CCF includes a filter CF and a black matrix BM.

The filter CF converts the color of the light, which is incident through the optical member OPL, according to the energy thereof, or allows the light to pass through as it is. The filter CF may include one or more light conversion particles.

The light conversion particle absorbs at least some of the incident light and then emits light having a particular color, or allows the incident light to pass through as it is. When the incident light has sufficient energy to excite the light conversion particles, the light conversion particles absorb at least some of the incident light to become an excited state, and then emit light of a particular color while becoming stabilized. Conversely, when the incident light has insufficient energy to excite the light conversion particles, the incident light passes through the filter CF as it is and thus may be perceived from the outside.

The color of the light emitted by the light conversion particles is determined according to the particle size. In principle, light having a longer wavelength is generated as the particle size becomes larger, and light having a smaller wavelength is generated as the particle size becomes smaller. In the exemplary embodiment, the light conversion particle may be a quantum dot (e.g., CCP-R or CCP-G in FIG. 10B).

The light emitted from the filter CF is emitted in various directions. Accordingly, the light generated by the filter CF may be emitted toward the second substrate SUB2, the black matrix BM, and the optical member OPL.

The black matrix BM is disposed adjacent to the filter CF. The black matrix BM includes light shielding material. The black matrix BM may have a shape corresponding to the surrounding area SA. The black matrix BM prevents light leakage phenomena to areas that are other than the pixel area PA in which the light is displayed, and clearly differentiates the boundaries between adjacent pixel areas.

The second substrate SUB2 is disposed on the color conversion filter CCF and thus protects the color conversion filter CCF. The second substrate SUB2 may include transparent insulating materials. The color conversion filter CCF is disposed directly on the optical member OPL, or may also be disposed at the second substrate SUB2 and assembled on the panel member PNL. However, this is an exemplary illustration, and in the display member 100 according to an exemplary embodiment of the invention, the second substrate SUB2 may also be excluded.

Figure 7:
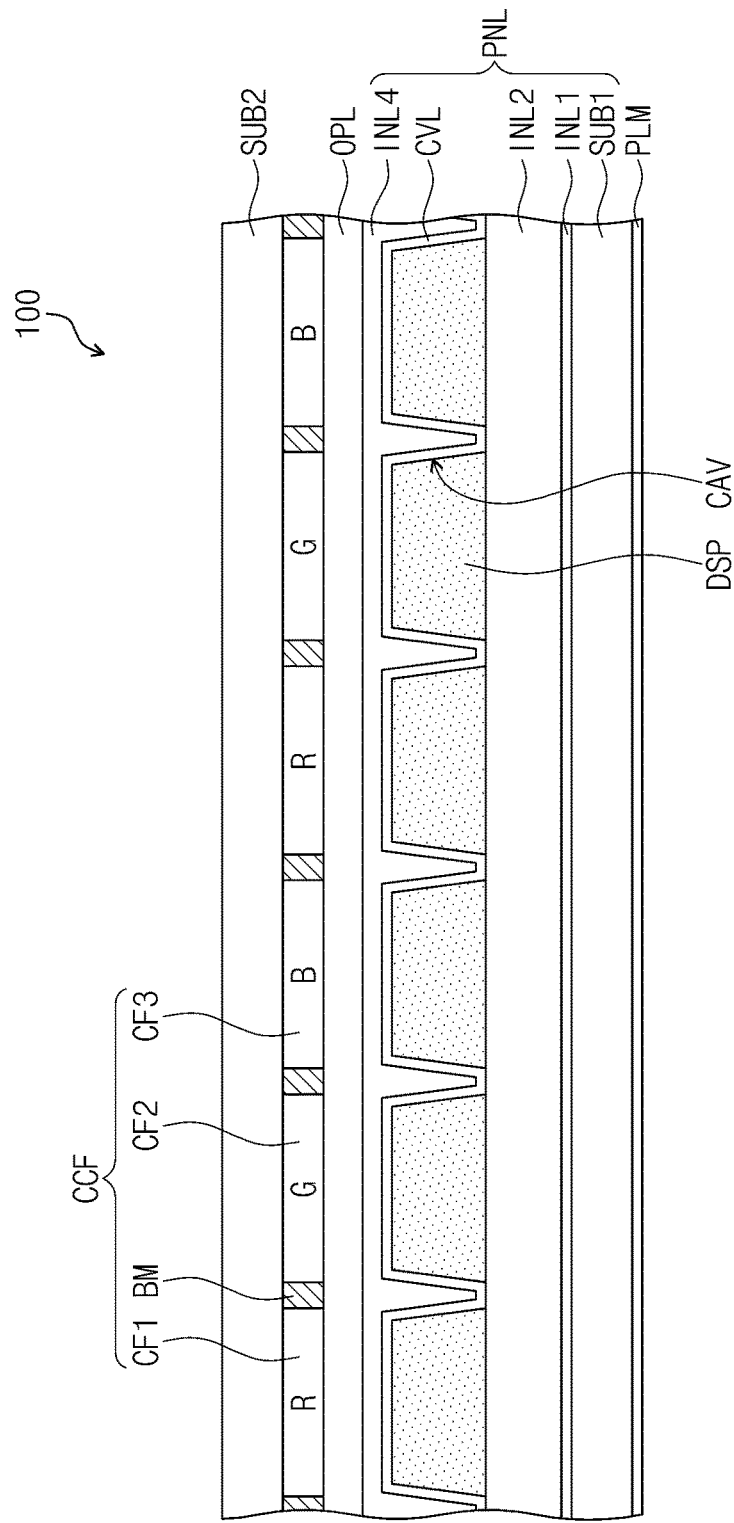
FIG. 7 is a cross-sectional view illustrating an exemplary embodiment of a display member according to the invention.

FIG. 7 is a cross-sectional view illustrating a display member according to an exemplary embodiment of the invention. Referring to FIG. 7, the display member 100 will be described in greater detail. Elements that are identical to those illustrated in FIGS. 1 to 6 will be assigned identical reference labels, and duplicate descriptions thereof will not be given.

In FIG. 7, a plurality of the cavities CAV is provided, and the color conversion filters CCF that include a plurality of the filters corresponding thereto are illustrated. Some elements of the panel member PNL were excluded in the illustration for ease of description.

As illustrated in FIG. 7, the plurality of filters may include a first filter CF1, a second filter CF2, and a third filter CF3. The black matrix BM is disposed between the first filter CF1, the second filter CF2, and the third filter CF3 and defines the boundaries between the first filter CF1, the second filter CF2, and the third filter CF3.

The first filter CF1, the second filter CF2, and the third filter CF3 may convert the light incident on the color conversion filter CCF into lights having different frequency ranges from each other. In an exemplary embodiment, the first filter CF1, the second filter CF2, and third filter CF3 may respectively generate light having a red color, a green color, and a blue color, for example.

Red, green, and blue each have different wavelengths. Accordingly, the first filter CF1 may generate light having a wavelength in the range of at least about 640 nm and at most about 780 nm, the second filter CF2 may generate light having a wavelength in the range of at least about 480 nm and at most about 560 nm, and the third filter CF3 may generate light having a wavelength in the range of at least about 430 and at most about 500 nm, for example.

As described above, the wavelength of the light that is generated may be determined according to the particle size of the quantum dot. Accordingly, among the first filter CF1, the second filter CF2, and the third filter CF3, the first filter CF1 may include the quantum dot with the largest particle size, and the third filter CF3 may include the quantum dot with the smallest particle size.

The third filter CF3 according to an exemplary embodiment of the invention may be a colorless filter or a gray filter. When the backlight unit (not shown) generates blue light, the third filter CF3 may even emit the blue light by allowing incident light to pass through as it is without color conversion. Here, the third filter CF3 may include various materials that enable at least some of the incident light to pass through, but is not limited to any particular embodiment.

Figure 8:
FIG. 8 is a cross-sectional view illustrating an exemplary embodiment of an optical member according to the invention.

FIG. 8 is a cross-sectional view illustrating an optical member according to an exemplary embodiment of the invention. As illustrated in FIG. 8, the optical member OPL may include the polarizing layer POL and a selective transmission/reflection layer SRL.

Among the incident light, only light that is polarized in a certain direction is transmitted by the polarizing layer POL. In an exemplary embodiment, the polarizing layer POL may include polyvinyl alcohol ("PVA"), which has a polarizing property, for example.

Here, the polarizing layer POL may, as described above, be facing the polarizing member PLM. Accordingly, the polarizing layer POL may have a transmission axis that is in a direction perpendicular to the transmission axis of the polarizing member PLM.

The selective transmission/reflection layer SRL is disposed on a surface of the polarizing layer POL. The selective transmission/reflection layer SRL may include a plurality of insulating films. The insulating films include a first insulating film IL1 and a second insulating film IL2. Each of the first insulating film IL1 and the second insulating film IL2 may be provided in plurality to be alternatingly laminated.

The selective transmission/reflection layer SRL may be a distributed Bragg reflector DBR. Accordingly, the half mirror layer includes one or more thin film pairs DBP. In FIG. 7, the half mirror layer HM2 having n number of thin film pairs HM2 is exemplarily illustrated.

The first insulating layer IL1 and the second insulating layer IL2 may have refractive indices that are different from each other. The selective transmission/reflection layer SRL according to an exemplary embodiment of the invention may be a distributed Bragg reflector or an enhanced specular reflector ESR.

Accordingly, based on Bragg's law, the selective transmission/reflection layer SRL may regulate which wavelength range is transmitted and which wavelength range is reflected. The wavelength ranges of the selective transmission/reflection layer that are transmitted and reflected may be determined by the difference in refractive index between the first insulating layer IL1 and the second insulating layer IL2, the difference in thickness between the first insulating layer IL1 and the second insulating layer IL2, and number of laminated layers in the first insulating layer IL1 and the second insulating layer IL2.

The selective transmission/reflection layer SRL may be a cholesteric liquid crystal film or a photonic crystal film. In an exemplary embodiment, the selective transmission/reflection layer SRL may easily bond with polyvinyl alcohol ("PVA") to have both a polarizing function and a reflecting function, for example.

The level of transmission and reflection of the selective transmission/reflection layer SRL may be regulated according to the applied voltage. The selective transmission/reflection layer SRL according to an exemplary embodiment of the invention may include various exemplary embodiments, but is not limited to any particular embodiment.

The selective transmission/reflection layer SRL may function as both a protective layer which protects the polarizing layer POL and a supporter which supports the polarizing layer POL. The selective transmission/reflection layer SRL prevents deformation of the polarizing layer POL caused by moisture.

Accordingly, the optical member OPL according to an exemplary embodiment of the invention may have the effect of reducing thickness while also performing both the polarizing function and the selective transmission/reflection function. In an exemplary embodiment, a cellulose triacetate ("TAC") film in a typical polarizing film has a thickness of about 50 micrometer (μm) to about 60 μm, for example. In contrast, the selective transmission/reflection layer SRL including the plurality of insulating layers may have a thickness equal to or less than about 10 μm, for example, and thus is advantageous for realizing a thin type of display device.

The optical member OPL according to an exemplary embodiment of the invention may be separately produced and then attached to the color conversion filter CCF (refer to FIG. 7) or panel member PNL (refer to FIG. 7) to thereby be assembled as the display member 100 (refer to FIG. 7). Accordingly, by being provided through a process that is independent of the color conversion filter CCF, damage to the color conversion filter CCF may be prevented, and the rework properties of the process may be improved.

Figure 9:
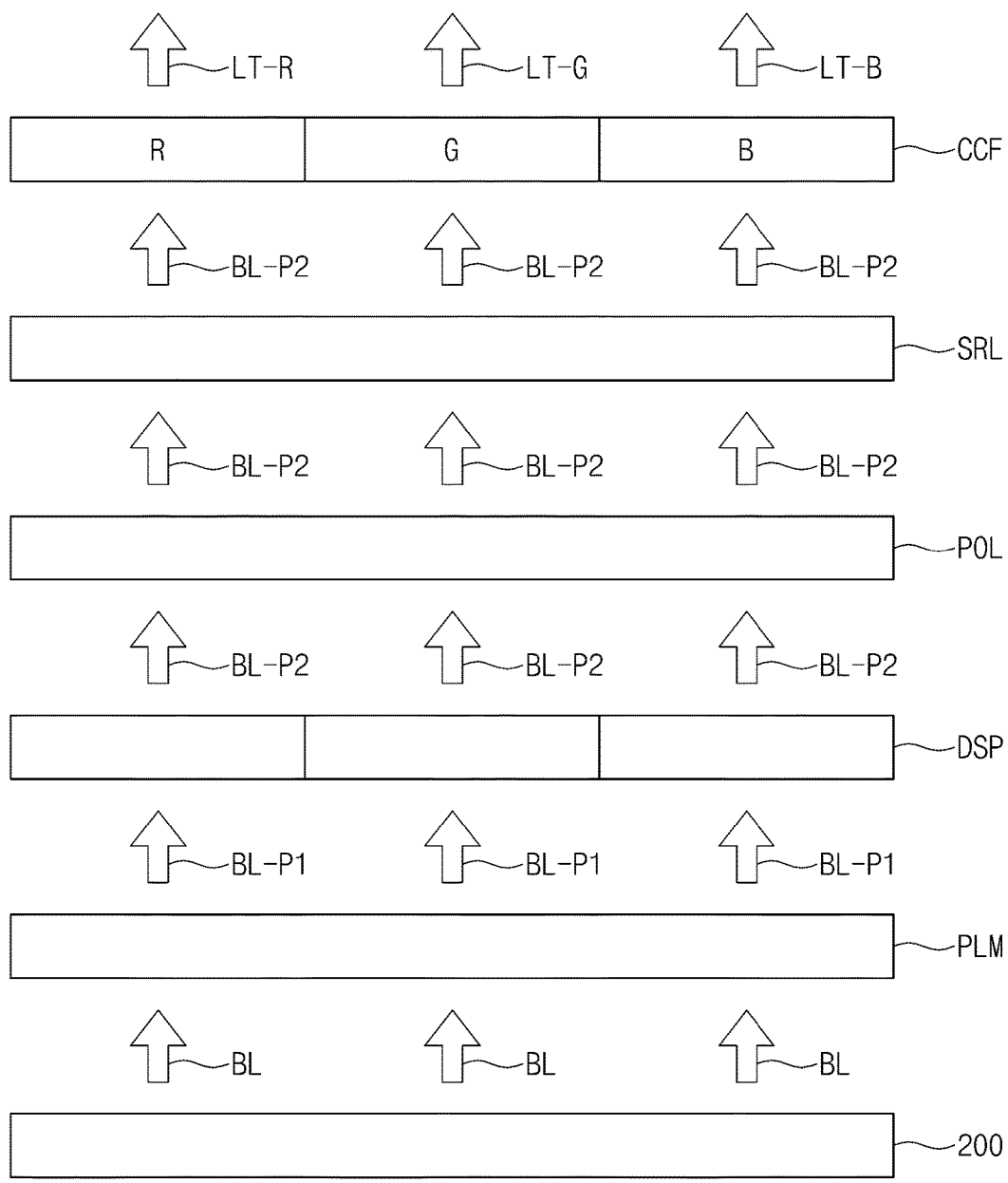
FIG. 9 is a cross-sectional view illustrating an exemplary embodiment of a light path in a display device according to the invention.

FIG. 9 is a cross-sectional view illustrating a light path in a display device according to an exemplary embodiment of the invention. FIGS. 10A to 10D are cross-sectional views illustrating respective light paths in each layer.

Hereinafter, with reference to FIGS. 9 to 10D, advantageous effects of the display device according to an exemplary embodiment of the invention will be described. Elements that are identical to those illustrated in FIGS. 1 to 8 will be assigned identical reference labels, and duplicate descriptions thereof will not be given.

As illustrated in FIG. 9, light generated in the backlight unit 200 is provided to the display member 100 that is disposed thereabove. Embodiments provided with backlight units 200 that generate blue light BL are exemplarily illustrated in FIGS. 9 to 10D.

The blue light BL passes through the polarizing member PLM to become a polarized first blue light BL-P1 that oscillates in one direction. The polarized first blue light BL-P1 may pass through the display element DSP to have the oscillation direction changed into a polarized second blue light BL-P2.

The polarized second blue light BL-P2 may be the light that oscillates in a direction perpendicular to the oscillation direction of the polarized first blue light BL-P1. In the illustrated exemplary embodiment, the display element DSP may be described by assuming that all of the light is transmitted without optical loss.

As described above, the polarizing layer POL has the transmission axis of which the direction is perpendicular to the transmission axis of the polarizing member PLM, and thus the polarized second blue light BL-P2 may easily pass through the polarizing layer POL to arrive at the selective transmission/reflection layer SRL.

The selective transmission/reflection layer SRL may selectively transmit or reflect the incident light according to the wavelength range thereof. In the illustrated exemplary embodiment, the selective transmission/reflection layer SRL may be designed to transmit blue light and reflect red or green light.

The light incident on the selective transmission/reflection layer SRL is the polarized second blue light BL-P2 of which only the polarization property was changed from the blue light BL generated in the backlight unit 200, and thus the incident light does not experience a color change and instead keeps the blue color. Accordingly, the polarized second blue light BL-P2 easily passes through the selective transmission/reflection layer SRL to arrive at the color conversion filter CCF.

Figure 10A:
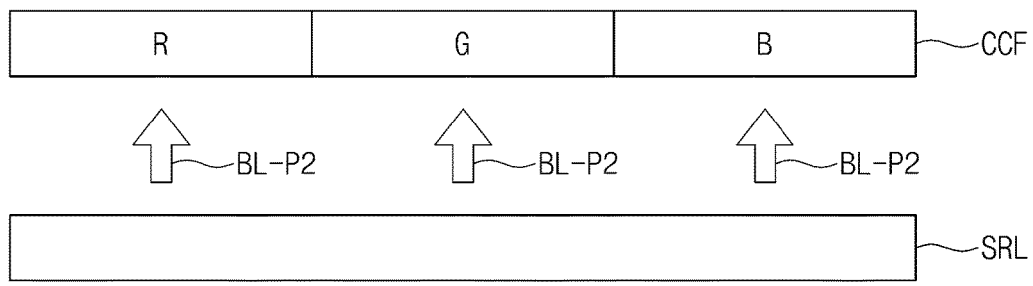
FIGS. 10A to 10D are cross-sectional views illustrating respective light paths in each layer.
Figure 10B:
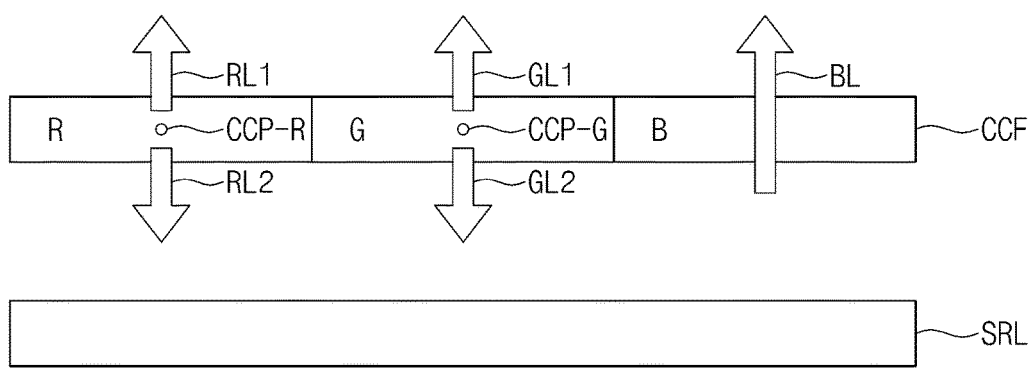

Referring to FIGS. 10A and 10B, the polarized second blue light BL-P2 is incident on the color conversion filter CCF to thereby provide energy to the light conversion particles in the color conversion filter CCF. In the exemplary embodiment, the color conversion filter CCF may include a first particle CCP-R that generates red light and a second particle CCP-G that generates green light.

The color conversion filter CCF may exclude the particles that generate blue light. Accordingly, among the polarized second blue light BL-P2, the light incident on the third filter passes through the color conversion filter CCF and is thus perceived from the outside. Here, a blue image light LT-B may have light intensity and polarizing properties that are substantially similar to the polarized second blue light BL-P2.

However, the exemplary embodiment of the invention is not limited thereto, and the color conversion filter CCF may also include particles that generate blue light. The polarized second blue light BL-P2 does not include sufficient energy to excite the particles that generate the blue light. Accordingly, even when the third filter includes the particles that generate blue light, the blue image light LT-B may have the light intensity and polarizing properties that are substantially the same as the polarized second blue light BL-P2.

The polarized second blue light BL-P2 has energy that is in the blue wavelength range and thus has a shorter wavelength range than the red wavelength range or the green wavelength range. Accordingly, the polarized second blue light BL-P2 has sufficient energy to excite the first particles CCP-R or second particles CCP-G.

The first particles CCP-R absorb at least some of the polarized second blue light BL-P2 to generate red light. Since the generated light is randomly emitted in various directions, the generated light is described by being divided into a first red light RL1, which is emitted upwards, and a second red light RL2, which is emitted downwards.

Similarly, the second particles CCP-G absorb at least some of the polarized blue light BL-P2 to generate green light. The generated light is described by being divided into a first green light GL1, which is emitted upwards, and a second green light GL2, which is emitted downwards.

The first red light RL1 and the first green light GL1 are emitted toward the top of the color conversion filter CCF and respectively become the red light LT-R and green light LT-G that may be perceived from the outside. In contrast, the second red light RL2 and second green light GL2 become incident on the selective transmission/reflection layer SRL.

Figure 10C:
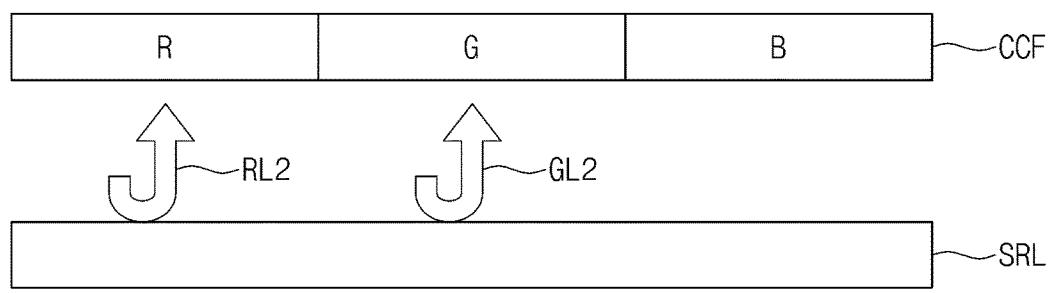

As illustrated in FIG. 10C, the second red light RL2 and the second green light GL2 may be reflected from the selective transmission/reflection layer SRL to become incident on the color conversion filter CCF. As described above, since the selective transmission/reflection layer SRL is designed to transmit blue light and reflect green or red light, the second red light RL2 and second green light GL2 that are emitted from the color conversion filter CCF may be reincident on the color conversion filter CCF.

Figure 10D:
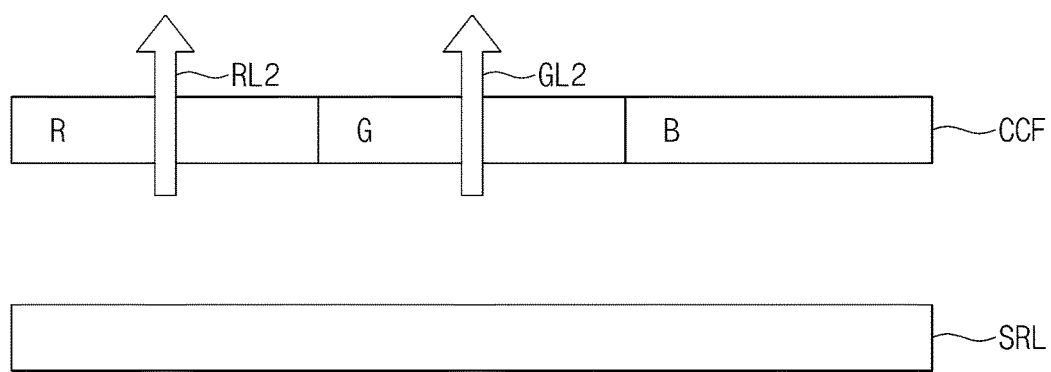

As illustrated in FIG. 10D, the second red light RL2 and second green light GL2 may easily pass through the color conversion filter CCF. The second red light RL2 and the second green light GL2 respectively have a red and green color, and thus respectively have insufficient energy to excite the first particles CCP-R and the second particles CCP-G.

Accordingly, the second red light RL2 and second green light GL2 that are reincident on the color conversion filter CCF are not absorbed in the first particles CCP-R and second particles CCP-G but may pass through as it is. The second red light RL2 and second green light GL2 that have passed through the color conversion filter are respectively included in a red image light LT-R and a green image light LT-G, and may thus be perceived from the outside.

Referring again to FIG. 9, each of the red image light LT-R, green image light LT-G, and blue image light LT-B, which are perceived from the outside and constitute the image, may be perceived from the outside without a substantial reduction in luminance from the light that is generated from the backlight unit 200.

Although there is a difference in that the blue image light LT-B is polarized light whereas the red image light LT-R and green image light LT-G are light from which the polarized light has been removed by the color conversion filter CCF, it is difficult for the human eye to distinguish such differences in polarization, and the effect on light intensity is small.

The display member 100 according to an exemplary embodiment of the invention may further include the optical member OPL to offset the reduction effect in light intensity that is due to the color conversion filter CCF emitting light in various directions. Accordingly, the display member 100 may be provided, having an improved luminance and realizing improved color reproducibility through the color conversion filter CCF.

Figure 11:
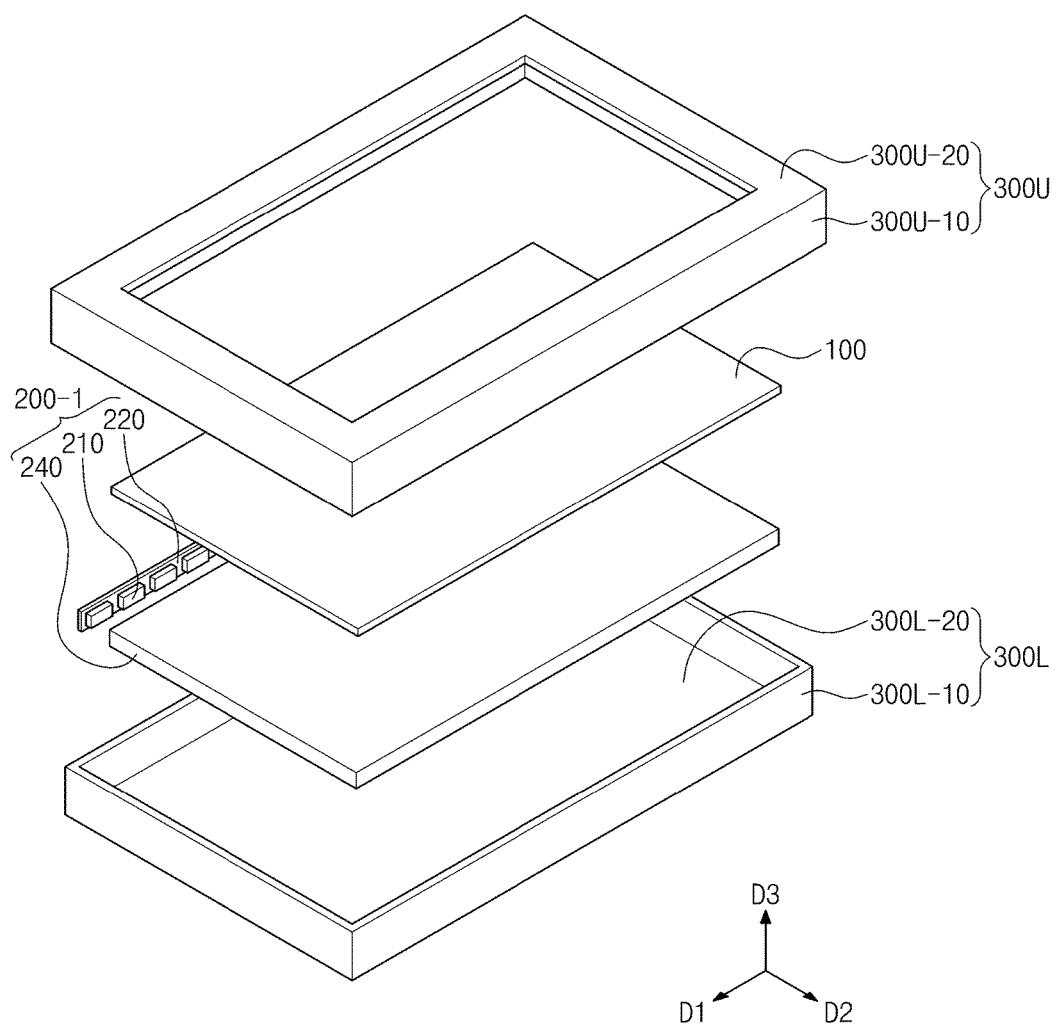
FIG. 11 is an exploded perspective view of an exemplary embodiment of a display device according to the invention.

FIG. 11 is an exploded perspective view of a display device according to an exemplary embodiment of the invention. Other than the different backlight unit 200-1, elements of the display device illustrated in FIG. 11 are substantially the same as those of the display device illustrated in FIG. 1. Thus, elements that are identical to those illustrated in FIGS. 1 to 10D will be assigned identical reference labels, and duplicate descriptions thereof will not be given.

As illustrated in FIG. 11, the display device may include an edge-type backlight unit 200-1. The backlight unit 200-1 may include the plurality of light emitting elements 210, the circuit board 220, and a light guide plate 240.

The circuit board 220 may be shaped as a bar of which the length extends in the first direction D1. The plurality of light emitting elements 210 may be mounted on the circuit board 220 and arranged along the first direction D1. Accordingly, the light emitting elements 210 may only provide light from one side wall of the display member 100.

The light guide plate 240 changes the path of the light received from the side wall and provides the light to the display member 100. The light guide plate 240 may have substantially the same shape as the display member 100. The light emitting elements 210 provide light along at least one side wall of the light guide plate 240, and the light is emitted through the front surface of the light guide plate 240 to be provided to the display member 100.

In the illustrated exemplary embodiment, when the light emitting elements 210 generate blue light, the light guide plate 240 may provide the light generated by the light emitting elements 210 to the display member 100 by only changing the light path and without changing the color of the generated light. Moreover, when the light emitting elements 210 generate white light, the light guide plate 240 further includes a light conversion member, and thus the path and color of the light received from the light emitting elements 210 are altered in order to provide blue light to the display member 100.

According to an exemplary embodiment of the invention, the display device with reduced power consumption and the thin type of display device may both be provided by including the edge-type backlight unit 200-1.

A display device according to an exemplary embodiment of the invention includes a color conversion filter and achieves an improved optical efficiency while also realizing a thin type of display device. Moreover, in the display device according to an exemplary embodiment of the invention, a limitation in which the color conversion filter is damaged during a process of providing an optical member may be overcome.

It will be obvious to those skilled in the art that the invention is not limited to the exemplary embodiments set forth herein, but may be enhanced or modified in various ways within the spirit and scope of the invention. Thus, such exemplary enhancements and modifications should be construed as falling within the scope of the following claims.

What is claimed is:
1. A display device, comprising:
a display member which displays images; and
a backlight unit which provides light to the display member,
wherein the display member comprises:
a base substrate;
a cover layer which is on the base substrate, extends in a first direction, and includes a plurality of portions which defines, a first cavity and a second cavity adjacent to each other in the first direction, the cover layer contacts the base substrate in some portions, is spaced apart from the base substrate in other portions to define each of the first cavity and the second cavity, and covers the cavity in the some portions spaced apart from the base substrate;

a first display element and a second display element disposed to respectively correspond to the first cavity and the second cavity;

a color conversion filter which is disposed on the cover layer, includes a first filter which overlaps the first cavity and converts a light incident on the first filter into a first color light having a first color, and a second filter which overlaps the second cavity and converts a light incident on the second filter into a second color light having a second color; and an optical member which is disposed between the color conversion filter and the cover layer, and which selectively transmits or reflects a light incident on the optical member according to a color of the light incident on the optical member.

2. The display device of claim 1, wherein:

the light provided by the backlight unit has a third color; and the optical member reflects a light having the first color or the second color, and transmits a light having the third color.

3. The display device of claim 2, wherein the light incident on the optical member comprises:

a first light which passes through the first cavity and the second cavity to be incident on the optical member among light provided by the backlight unit; and a second light which is incident on the optical member among the first color light and the second color light.

4. The display device of claim 3, wherein the first filter transmits a light having the first color among a light re-incident on the first filter reflected from the optical member, and the second filter transmits a light having the second color among a light re-incident on the first filter reflected from the optical member.

5. The display device of claim 4, wherein the color conversion filter further includes a third filter which converts a light incident on the third filter into a third color light having the third color, and transmits the third color light.

6. The display device of claim 2, wherein the optical member comprises:

a polarizing layer having a predetermined transmission axis; and a selective transmission/reflection layer which is disposed on the polarizing layer, reflects a light having the first color and a light having the second color and transmits a light having the third color among the light incident on the optical member.

7. The display device of claim 6, further comprising a polarizing member disposed between the display member and the backlight unit, and having a transmission axis of which a direction is perpendicular to the predetermined transmission axis of the polarizing layer.

8. The display device of claim 6, wherein the selective transmission/reflection layer comprises:

a plurality of first insulating layers, each of which has a first refractive index; and a plurality of second insulating layers, each of which has a second refractive index which differs from the first refractive index, wherein the plurality of first insulating layers and the plurality of second insulating layers are alternatingly stacked.

9. The display device of claim 8, wherein a thickness of the selective transmission/reflection layer is equal to or less than about 10 micrometers.

10. The display device of claim 6, wherein the selective transmission/reflection layer is a cholesteric liquid crystal film or a photonic crystal film, and the polarizing layer comprises polyvinyl alcohol.

11. The display device of claim 1, wherein the plurality of portions is each spaced apart from the base substrate, from one end to the other end of the each of the portions in a second direction crossing the first direction.

12. The display device of claim 11, wherein each of the first cavity and second cavity has a tunnel shape extending in the second direction.

13. The display device of claim 12, wherein:

a liquid crystal is filled in each of the first cavity and the second cavity; and each of the first display element and the second display element defines a liquid crystal capacitor.

14. The display device of claim 13, wherein the display member further comprises an alignment layer which is disposed on an inner surface of the cover layer, and provided in the first cavity and the second cavity.

15. The display device of claim 1, wherein the color conversion filter includes a plurality of quantum dots.

16. The display device of claim 15, wherein the plurality of quantum dots comprises:

a plurality of first particles which are included in the first filter; and a plurality of second particles which are included in the second filter, wherein a particle size of each of the plurality of first particles is different from a particle size of each of the plurality of second particles.

17. A display device, comprising:

a backlight unit which provides a single first color light having a single first color;

a panel member which receives the first color light and includes a plurality of pixels;

an optical member which is disposed on the panel member, reflects the first color light and transmits a second color light having a second color different from the first color; and a color conversion filter disposed on the optical member and including a plurality of quantum dots, wherein a plurality of cavities respectively corresponding to the pixels is defined in the panel member, and wherein each of the plurality of cavities is filled with a liquid crystal.

18. The display device of claim 17, wherein the optical member comprises:

a polarizing layer which transmits a light which oscillates in one direction;

a plurality of first insulating layers disposed on the polarizing layer and each having a first refractive index; and a plurality of second insulating layers disposed on the polarizing layer and each having a second refractive index, wherein the plurality of second insulating layers is alternatingly stacked with the plurality of first insulating layers.

19. The display device of claim 18, wherein:

the plurality of cavities arranged in a matrix form; and the color conversion filter includes a plurality of filters respectively corresponding to the plurality of cavities, and a black matrix disposed between the plurality of filters.

20. The display device of claim 19, wherein the filters comprise:

a first filter including, among the plurality of quantum dots, quantum dots which receive the first color light to generate a light having the second color; and
a second filter which transmits the first color light.

\* \* \* \* \*